Patented Oct. 13, 1942

2,298,473

UNITED STATES PATENT OFFICE 2,298,473

CONDENSATION OF POLYALKYLOL GUANIDINE SALTS

Walter P. Ericks, Cos Cob, Conn., assignor to American Cyanamid Company, New York, N. Y., a corporation of Maine No Drawing. Application August 6, 1941,
Serial No. 405,719

7 Claims. (Cl. 260—68)

This invention relates to the preparation of resinous and wax-like materials, and more particularly to condensation products of polyalkylol guanidine salts with polybasic acids and to the process for preparing them.

It is an object of the present invention to produce, by a simple process requiring simple equipment, condensation products of polyalkylol guanidine salts and polybasic acids.

It is a further object of the invention to prepare resinous and wax-like materials suitable for the formulation of coating compositions and for use in the preparation of artificial fibers, adhesives, floor polishes, and the like.

The foregoing objects of the present invention are accomplished by heating a polycarboxylic acid or anhydride with an acid salt of a polyalkylol guanidine. The guanidine salts used may be represented by the following general formula:

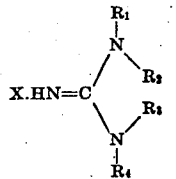

in which X is an acid group and $R_1$, $R_2$, $R_3$ and $R_4$ are hydrogen, alkylol (including alkoxyalkylol), hydrocarbon, etc., at least two of the R's being alkylol groups.

The invention will be described in greater detail in connection with the following examples in which the proportions are in parts by weight, it being understood that it is not intended to limit the invention to the specific embodiments set forth.

EXAMPLE 1

*N,N'-diethylol guanidine hydrochloride and phthalic anhydride*

|  | Parts |
|---|---|
| N,N'-diethylol guanidine hydrochloride | 36.8 |
| Phthalic anhydride | 28.8 |

These substances are placed in a suitable reaction vessel and heated slowly from room temperature, i. e., about 25–30° C., up to about 180° C. within 2 hours. Upon cooling, a semi-solid resinous material is formed.

EXAMPLE 2

30 parts of the reaction product prepared according to Example 1 is refluxed with 100 parts of formalin (30% formaldehyde in water) for 1 hour with constant stirring. The water and excess formalin are removed by evaporation, the reaction mixture being heated until a temperature of 140° C. is reached. The product, upon cooling, is a hard resin.

EXAMPLE 3

*N-ethylol N'-diethylol guanidine acetate and sebacic acid*

|  | Parts |
|---|---|
| Monoethylol cyanamide (90%) | 19.1 |
| Diethanolamine | 21 |
| Glacial acetic acid | 24 |

N-ethylol N'-diethylol guanidine acetate is prepared by heating the above substances in a suitable reaction vessel equipped with a stirrer at about 130° C. for 30 minutes. 30.6 parts of sebacic acid are then added to the reaction product thus obtained and the mixture is further heated to 165° C. At this temperature foaming occurs and the temperature is raised slowly to 200° C. over a period of about 1 hour. Upon cooling a light amber-colored balsam-like material is obtained.

EXAMPLE 4

*N-(2 - methyl-propylol - 2) -N'- ethylol-guanidine hydrochloride and phthalic anhydride*

|  | Parts |
|---|---|
| Mono-(2-methyl-propylol-2) cyanamide | 22.8 |
| Monoethanolamine hydrochloride | 19.5 |

These substances are placed in a suitable reaction vessel equipped with a stirrer and heated at about 130° C. for 30 minutes. 29.6 parts of phthalic anhydride are added in small portions to the above reaction product and the heating is continued at 130° C. with constant stirring. When the addition of phthalic anhydride is complete the mixture is heated with stirring for an additional 30 minutes at 140° C. Upon cooling a hard, flexible resin is obtained.

EXAMPLE 5

*N-lauryl-N'- diethylol guanidine hydrochloride and succinic acid*

|  | Parts |
|---|---|
| N-lauryl-N'-diethylol guanidine hydrochloride | 18.1 |
| Succinic acid | 5.9 |

The N-lauryl-N'-diethylol guanidine hydrochloride is heated in a suitable reaction vessel to 110° C. and the succinic acid is added in small portions with stirring. The mixture is heated to about 130° C. within 30 minutes and this temperature is maintained for an additional 30 minutes. Upon cooling the product is a viscous light amber-colored resin.

Other polyalkylol guanidine salts may be substituted for part or all of those used in the preceding examples. Various mixtures of any of them may be similarly employed. Such compounds include the salts of N,N'-dimethylol guanidine, N,N'-dipropylol guanidine, N,N'-dibutylol guanidine, N-ethylol-N'-butylol guanidine, N-ethylol-N'-dihydroxypropyl guanidine, and the like. Mono- and dihydrocarbon substituted guanidine salts such as N-octadecyl-N'-diethylol and N-diethylol-N'-diethyl guanidine, etc., which have at least two alkylol substituents may also be utilized. Alkoxyalkylol derivatives, particularly those formed by reacting compounds such as ethylene oxide with guanidine, may be employed in obtaining products having special characteristics. Thus the alkoxyalkylol group may be represented by the formula $(CH_2CH_2O)_nCH_2CH_2OH$, where $n$ is 1, 2, 3, etc. The polyethoxy ethanol guanidines may be easily produced by condensing ethylene oxide with guanidine. This invention also contemplates the use of guanidine compounds containing one or more alkylol groups together with one or more alkoxyalkylol groups. Biguanide compounds corresponding to any of the foregoing may be used in the same general manner. The salts of these substituted guanidines may be either inorganic or organic acid salts, e. g., the hydrochlorides, the acetates, the sulfates, the phthalates, etc.

Similarly, it is not intended to limit the present invention to the particular polycarboxylic acids and anhydrides set out in the examples. Representative examples of suitable polycarboxylic acids include tartaric, succinic, sebacic, pimelic, terephthalic, brassylic, citric, adipic, etc., acids or anhydrides.

The condensation products of polycarboxylic acids and polyalkylol guanidine salts may be condensed with an aldehyde e. g. formaldehyde, polymers of formaldehyde, acetaldehyde, crotonaldehyde, heptaldehyde, benzaldehyde, cinnamyl aldehyde, etc. The reaction with formaldehyde may be carried out as in Example 2 or in any other suitable manner. Thus films of our resinous condensation products may be treated with an aldehyde particularly in the vapor state e. g., formaldehyde gas.

Moreover, the polycarboxylic acid-polyalkylol guanidine mineral acid salt condensation products can be obtained in form of free bases by treating them with sodium metal dissolved or reacted with a suitable organic solvent, such as methanol or ethanol. The inorganic salt formed in the course of the reaction is then filtered off and the free base obtained upon evaporation of the alcohol can be further reacted with an organic polycarboxylic acid to form a resinous product of higher water resistance.

Any desired pigment, dye, lake or filler may be admixed with the above described condensation products, e. g., Sudan IV, nigrosine, wood flour, wood fiber, paper dust, clay, zein, glass wool, mica, granite dust, silk flock, cotton flock, steel wool, carborundum, paper, cloth, sand, etc.

The resinous materials of this invention may be modified by employing monohydric alcohols or monocarboxylic acids in conjunction with the alkylol guanidine salts and the polycarboxylic acids or anhydrides according to the principles well known in the alkyd resin art. Furthermore, part of the alkylol guanidine compounds may be substituted with other polyhydric alcohols, e. g., glycerine, ethylene glycol, diethylene glycol, triethylene glycol, tetraethylene glycol, hexaethylene glycol, the polymethylene glycols (e. g., octadecanediol), etc.

For many purposes the resins obtained according to the present invention are preferably modified with drying oil acids. This may be accomplished by heating the condensation products with the drying oils themselves, the drying oil fatty acids, as well as the mono- and diglycerides thereof. These compositions are particularly suitable for use in coating compositions such as paints, varnishes, etc. In some instances, it may be desirable to modify our condensation products with fatty oils which are not strictly drying oils.

The resinous products of the present invention are suitable for use in the various commercial coating compositions which are formulated with more or less material of a resinous nature. For example, the resins may be dissolved in a suitable solvent such as xylene, the resin being used in sufficient proportion to obtain the desired viscosity characteristics. Moreover, they may be modified, if desired, by admixture and/or reaction with phenolic aldehyde resins or condensates, vinyl esters or polymers, urea-aldehyde condensates, aminotriazine-aldehyde condensates, rosin, ester gum, nitrocellulose, cellulose acetate, etc., and the resulting compositions used in paints, lacquers, floor polishes, and the like.

The condensation products of the present invention have a wide field of utility in addition to their incorporation in coating compositions. For instance, they may be used in the preparation of molding compositions, laminated materials, adhesives, artificial fibers, and the like. They also find application in the treatment of textiles, paper, leather and other fibrous materials. They may be used in solution, emulsion or in any other convenient form.

I claim:

1. A condensation product of a polyalkylol guanidine salt with a member of the group consisting of polycarboxylic acids and their anhydrides.

2. A condensation product of N,N'-diethylol guanidine hydrochloride with phthalic anhydride.

3. The reaction product of an aldehyde and a condensation product of a polyalkylol guanidine salt with a member of the group consisting of polycarboxylic acids and their anhydrides.

4. A reaction product of a formaldehyde and a condensation product of N,N'-diethylol guanidine hydrochloride with phthalic anhydride.

5. A condensation product of N-ethylol N'-diethylol guanidine acetate and sebacic acid.

6. A process which comprises heating a polyalkylol guanidine salt with a member of the group consisting of polycarboxylic acids and their anhydrides to effect condensation thereof.

7. The process which comprises heating N,N'-diethylol guanidine hydrochloride with phthalic anhydride to effect condensation thereof.

WALTER P. ERICKS.